(No Model.)
C. STEINER.
MACHINE TAP AND DRILL.
No. 410,614. Patented Sept. 10, 1889.
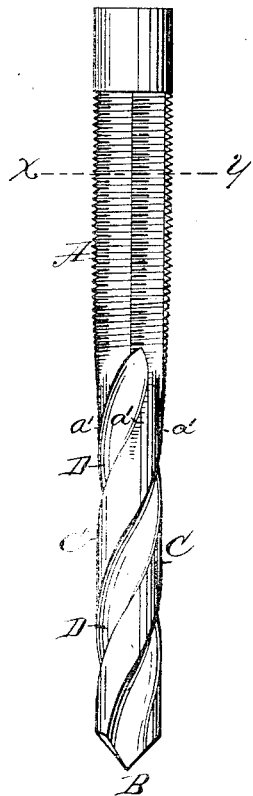
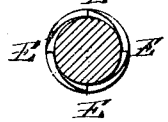
Witnesses
James M. Hicks
Jas. C. Warner
Inventor
Christian Steiner
By his Attorney
H. L. Bennem

UNITED STATES PATENT OFFICE.

CHRISTIAN STEINER, OF NEW YORK, N. Y.

MACHINE TAP AND DRILL.

SPECIFICATION forming part of Letters Patent No. 410,614, dated September 10, 1889.

Application filed March 9, 1889. Serial No. 302,695. (No model.)

*To all whom it may concern:*

Be it known that I, CHRISTIAN STEINER, a citizen of Switzerland, at present residing in the city, county, and State of New York, have invented and made certain Improvements in Machine Taps and Drills; and I hereby declare that the following is a full, clear, and exact description of the same, reference being had to the drawings forming part of the same.

My invention has for its object the combining in one tool both a twist-drill for forming the hole and a threaded tap for cutting a thread in the hole when drilled, so that the drilling of the hole and the threading of the same may be done by the same tool without removing the tool until the continuous operation is completed.

I am aware that drills and taps have been combined in one tool previous to my invention for drilling gas and water pipes, in which the drill was formed upon the end of a tap and had no shank or blank space on the drill for the purpose of guiding and holding the drill solidly in the hole independent of the cutting-edges.

My invention consists in forming the tap-threads upon the shank of a twist-drill, which has spiral grooves in its sides for carving off the chips, and is provided with parallel sides above the cutting point or end of the drill to guide and hold the drill steady while boring, and in beginning the threads on the upper portion of the edges of these spiral grooves, where the taper part of the tap begins, and in forming the tap proper above these grooves.

In order that persons skilled in the art may understand, construct, and use my invention, I will proceed to describe it, referring to the drawings forming a part of this schedule, in which—

Figure 1 is a side view, and Fig. 2 a sectional view on line $x\ y$ of Fig. 1.

A is the threaded portion of my combined tool, or the tap, the upper portion of which presents tap-teeth cut by grooves made substantially in line with the center line of the drill and tap, while the lower portion of the teeth of the thread, as seen at $a'$, are formed upon the sides of the spiral grooves of the tap, which begins to increase in size at this point.

B is the cutting end of the drill, and C is the straight portion of the drill for guiding and steadying it while drilling and before the tap begins to do its work.

D are the spiral grooves for clearance.

E are the tap-teeth, Fig. 2.

The operation of my invention is as follows: The point of the drill is pressed against the material to be drilled and the drill is revolved by hand or by machinery. The cutting-edges remove the substance and form a round hole of the size of the diameter of the drill through the metal until the part $a'$ is reached, whereupon the tap-teeth begin to form grooves in the circumference of the hole drilled, slight at first and deeper as the tool advances under pressure, until a pathway has been formed by the teeth, so that they are guided thereby and the succeeding teeth are drawn forward, at the same time cutting these grooves deeper until the full size of tap-threads has been reached, when the threaded hole having then been completed, the tool is reversed in motion and drawn out preparatory to another operation.

Having now fully described my invention, what I claim as new and useful is—

1. The combination, substantially as hereinbefore set forth, of a twist-drill provided, as described, with a tapping device above and in connection with the spiral portion of said drill, and parallel sides located between the taper cutting-edges and the tapping-teeth, all arranged and operating substantially as set forth.

2. In a twist-drill, the combination of a tap having a portion of its threads upon the spiral grooved portion of the drill.

CHRISTIAN STEINER.

Witnesses:
W. L. BENNEM,
JAS. E. WARNER.